Patented Feb. 16, 1954

2,669,533

UNITED STATES PATENT OFFICE 2,669,533

METHOD OF MAKING GERMANIUM HALL PLATES

William Crawford Dunlap, Jr., Schenectady, N. Y., assignor to General Electric Company, a corporation of New York No Drawing. Application January 3, 1951, Serial No. 204,277

11 Claims. (Cl. 148—11.5)

My invention relates to methods of making germanium Hall plates and, more particularly, to methods of treating Hall plates so as to improve the electric characteristics thereof.

The term "Hall plate" herein employed, has become definitive of certain metallic plates, usually lying within a class known as "semiconductors," which exhibits a potential difference along one axis, such as the transverse axis of the plate, when a current is passed along an orthogonal axis, such as the longitudinal axis, under the influence of a magnetic field perpendicular to the plane of the plate. This phenomenon is called the "Hall effect"; and such Hall plates have found wide application in measurement devices and computing apparatus. Highly purified germanium has been found to exhibit this Hall effect to an unusual degree; i. e. to have a high "Hall coefficient"; this Hall coefficient representing the voltage produced across the plate times unit thickness, per unit current and unit magnetic field.

In the conventional method of making such germanium Hall plates, a germanium ingot is formed by methods well known to the art and the Hall plates are cut out of the ingot. The ingot usually comprises germanium which has been highly purified although, in some cases, germanium impregnated with extremely small predetermined amounts of known conduction-carrier-inducing impurities may be used. The Hall plates are usually rectangular in shape and of small size in order to augment the influence of the electric and magnetic fields. Typical dimensions for such Hall plates are in the order of a length of .25 inch a width of .10 inch, and a thickness of about .02 inch. When mounted in Hall effect devices, a pair of input electrodes are usually secured along one pair of opposing edges of the plate to enable a current to be passed along one axis of the plate, and a second pair of output electrodes are secured to edges extending perpendicular to the input electrode supporting edges to receive the voltages developed along the axis perpendicular to the current carrying axis of the plate.

One characteristic by which the suitability of a particular Hall plate for Hall effect applications may be determined, is the "mobility" of the plate. By "mobility" is meant the mean drift velocity of conduction carriers produced within the plate when subjected to the influence of a unit electric field. This mobility characteristic of the plate, in turn, represents the ratio between the Hall coefficient and the resistivity of the Hall plate. Hall plates having a mobility of about 2,000 centimeters squared per volt second are well suited for Hall effect devices since a relatively large voltage will be produced between the output electrodes of such plates for a given input current and magnetic field strength.

Another indication of the quality of a particular Hall plate, is the "homogeneity" thereof; the term homogeneity defining the degree of uniformity of electric characteristics throughout the entire Hall plate involved. The better the homogeneity, the more linear the relationship between input current and output voltage produced by the Hall plate.

Probably due to the fact that extremely minute concentrations of impurities cause a marked effect upon the electrical properties of germanium, good homogeneity in wafers extracted from even a highly purified ingot of germanium is the exception rather than the rule. Moreover, both the mobility and homogeneity of each wafer thus extracted, usually varies to a considerable degree from the mobility and homogeneity of other wafers extracted from the same ingot. Furthermore, the percentage of Hall plates produced from the single ingot which have a mobility above 2,000 centimeters squared per volt second is usually less than 50%. Consequently, each plate must ordinarily be individually tested to determine suitability for use as the effective unit in the destined Hall effect device. Such inhomogeneity, non uniformity, and necessity for individual testing has precluded the application of mass production techniques to such Hall effect units and has enhanced their cost. Attempts which have heretofore been made to improve the yield have generally been directed toward improving the purity and quality of the entire ingot, and have normally involved highly exacting chemical apparatus and treatments over unusually long periods of time.

Accordingly, an object of my invention is to provide a method for making improved germanium Hall plates having good homogeneity and high mobility.

Another object of my invention is to provide a method of treating Hall plates so as to improve the homogeneity and mobility characteristics of each Hall plate and to improve the uniformity of such characteristics throughout a plurality of Hall plates prepared in accordance with my invention.

Another object of my invention is to provide a method for making improved germanium Hall plates which is adaptable to mass production techniques.

Another more specific problem which has arisen in the use of germanium Hall plates as the effective unit in measuring instruments, results from the fact that as the germanium ingot is purified its inherent bulk resistivity normally rises, such that germanium having an inherent bulk resistivity at room temperature above 5 ohm centimeters is considered relatively free from contaminating impurities. The term "inherent bulk resistivity" is herein employed to define the electric resistivity of germanium subjected during preparation to a normal process of slow cooling over a period of at least one hour. Although from the viewpoint of homogeneity, stability and mobility, it is desirable to employ highly purified germanium having such high inherent bulk resistivity it is also usually desirable that Hall plates destined for use in sensitive electric measuring instruments have much lower resistivity in order to match the low impedance circuits of such instruments.

Accordingly, a further specific object of my invention is to provide a method for making germanium Hall plates having good homogeneity and high mobility and yet having low resistivity.

A still further specific object of my invention is to provide a method of making germanium Hall plates whereby the stability of the plates both to electrical and temperature variations is improved.

In general, my new method for making improved germanium Hall plates comprises heating a wafer of highly purified germanium such as comprise the conventional Hall plates for an extended period of time at a temperature ranging from 600 degrees centigrade up to the melting point of the germanium, which is in the neighborhood of 950 deg. centigrade, and then rapidly cooling the germanium wafer at a cooling rate of at least 200° per second. The term "cooling rate" is employed herein to connote the rate of cooling between two closely adjacent temperatures measured at the surface of the wafer when the wafer is initially immersed within a coolant. This method of treatment may be applied to the bare germanium wafer or may be applied to the wafer after electrodes have been mounted thereto. Such treatment has been found to increase the homogeneity of the sample and the mobility of the conduction carries therein. The rapid cooling, which may be termed a "quenching" step, results in a germanium Hall plate which has P-type characteristics regardless of whether the wafer as extracted was N-type or P-type. Moreover, the resistivity of the germanium wafer is reduced to a low value, normally within a range of 0.5 to 1.5 ohm centimeter regardless of the inherent resistivity; and this low value final resistivity has been found to be controllable by the temperature at which the sample has been heated for the extended period of time.

In a modification of the above-described general method, the rapid cooling of the wafer after heating is accomplished in a number of cooling steps rather than in a single cooling from the elevated temperature to room temperature. By cooling through successive temperature steps as from the elevated temperature down to 400 degrees and then from 400 degrees down to room temperature, breakage of the fragile Hall plates due to thermal shock is minimized. Moreover, no discernible difference in electrical properties of the final wafer results.

For a more detailed description of the present invention, the following specific example is given as illustrative of the process of making germanium Hall plates in accord with my invention.

In this preferred method, germanium oxide of above 99% purity, is placed in a graphite boat or crucible and reduced by heating in an atmosphere, such as hydrogen or helium, which is chemically inactive with respect to germanium. After cooling, the resultant solidified ingot may be further purified by well known purification techniques, such as by evaporation of the impurities or by subjecting the ingot to successive stages of remelting followed by directional cooling. The ingot is purified until its inherent bulk resistivity is above five ohm-centimeters and preferably much higher, such as in the neighborhood of 20 ohm-centimeters.

Wafers having a thickness no greater than .060 inch and preferably in the neighborhood of .020 inch, and having any convenient length and width are then cut out of the ingot by such means as a diamond saw. These wafers constitute the Hall plates, and in most conventional methods of making such Hall plates, the wafer is subjected to no further treatment other than that entailed in attaching suitable electrodes to the edges thereof.

In accordance with my invention, these wafers either with or without the electrodes attached thereto are then heated at a temperature ranging from 600 deg. centigrade up to a temperature just below the melting point of germanium for an extended period of time more than one-half hour and preferably in the neighborhood of two or three hours although no difference in final characteristics has been discernible in wafers heated for a much greater interval of time, such as twenty hours.

The heated wafers are then rapidly cooled or "quenched" to room temperature at a rate of cooling of at least 200 deg. per second. Cooling rates considerably above 200 deg. per second are preferred, however, although the cooling rate should not be so fast as to cause breakage of the germanium crystal due to thermal shock. The cooling medium must be one that is chemically inactive with respect to germanium and may comprise, for example, distilled water, silicone oil, or a blast of rapidly moving hydrogen or helium. In many cases, especially where it is desired to employ Hall plates comprising very thin wafers of germanium, such as wafers having a thickness of .040 inch or less, I have found that it is preferable, in order to avoid breakage due to thermal shock, to use successive stages of quenching to successively lower temperatures; each quenching stage being followed by the succeeding stage after only a brief time interval, preferably no more than a few seconds, such as ten seconds. By such successive quenching stages the rate of cooling is prevented from becoming excessive. A two-stage quenching step, such as from 800 degrees centigrade to 400 degrees and then from 400 degrees to room temperature, has been found to reduce the breakage considerably Further reduction in the percentage of breakage can be achieved by using a three stage quenching step, such as from 800° centigrade to 600° to 400° to room temperature.

The coolant employed for quenching at these intermediate temperatures such as at 600° or 400°, must, of course, be one that can withstand the temperature involved without appreciable decomposition. Molten salts such as zinc chloride, have been found suitable for the purpose.

Hall plates subjected to the above described heating and quenching steps, generally display increased mobility, usually above 2000 cm.$^2$/volt sec., and have better homogeneity after treatment than before. Moreover, the final resistivity of the plate is considerably reduced to values generally ranging between 0.5 and 1.5 ohm-centimeters. However, it has been found that the temperature at which the Hall plates are heated before quenching determines to some extent the final resistivity of the plate after quenching. In general, the higher the heating temperature the greater will be the resistivity change. It has also been found that the final resistivity of the Hall plate may be further controlled by reheating the plates, after the quenching to room temperature, to intermediate temperatures in the neighborhood, for example, of 500 degrees centigrade for several hours; the resistivity increasing upon being subjected to such a reheating step.

As long as the germanium from which the wafer is cut is of high purity i. e. has an inherent bulk resistivity above five ohm centimeters, the wafer is almost invariably converted to P-type material regardless of whether the geraminum exhibited N-type or P-type characteristics before the treatment of my invention, the type of material being determined by the polarity of the output voltage when a direct current is passed through the Hall plate under the influence of a magnetic field from a given direction with respect to the current.

The following table indicates typical changes which occur in the resistivity, mobility and type of Hall plates before and after being subjected to the heating and quenching steps of my invention.

| | Sample | Resistivity (ohm-centimeter) | Mobility (cm.$^2$/volt sec.) | Type |
|---|---|---|---|---|
| Before | 49 | .016 | 1,550 | N |
| After | | .87 | 2,169 | P |
| Before | 138 | .44 | 635 | P |
| After | | .76 | 4,210 | P |
| Before | 235 | .42 | 1,154 | P |
| After | | .67 | 2,970 | P |
| Before | 291 | 3.58 | 552 | N |
| | | .92 | 3,120 | P |
| Before | 294 | 4.81 | 558 | N |
| After | | .78 | 2,672 | P |
| Before | 305 | 3.35 | 1,419 | P |
| | | .47 | 2,450 | P |
| Before | 307 | 2.68 | 1,033 | P |
| After | | .50 | 2,690 | P |
| Before | 122 | 14.4 | 2,201 | N |
| After | | .45 | 2,400 | P |
| Before | 94 | 9.9 | 2,970 | (1) |
| After | | .86 | 2,825 | P |
| Before | 242 | 3.06 | 2,440 | N |
| After | | .63 | 2,740 | P |

1 Mixed N and P.

Hall plates prepared in accordance with my invention appear to retain their improved characteristics permanently or at least for very long periods of time. Samples placed in continuous use for six months at 100 deg. C. showed no appreciable change in characteristics and are more stable at 100 deg. than conventional type Hall plates. Such treated Hall plates should, however, be operated below temperatures in the neighborhood of 200 deg. centigrade since higher temperatures will, in time, produce marked changes in resistivity and other properties of the plate. This fact in no way limits the application of the treated Hall plates however, since Hall plates produced according to conventional methods are rarely operated at temperatures above 120 deg. centigrade since the output voltage of such conventional Hall plates no longer has a linear relation to input current above such temperatures. Hall plates prepared in accord with my invention, however, display a substantially linear relation between input current and output voltage regardless of temperature variations up to temperatures in the neighborhood of 200 deg.

Although a complete explanation of the reasons for the improved mobility, homogeneity and lower resistivity of the Hall plates treated in accord with my invention is not yet completely determined, it is believed that these improved characteristics are due to the uniform introduction into the volume of the sample of positive carriers at equilibrium at the elevated temperature. It is believed that these carriers result from atomic lattice defects. An alternate theory, not yet disproven, is that the P-type character results from uniform solution of P-type impurities that tend to precipitate non-uniformly if the sample is cooled slowly. In either case the large numbers of carriers introduced will be of P-type and will predominate over the carriers previously present. Homogeneity is best, of course, if the previous resistivity was high and the normal carrier density small.

Although I have described particular methods of making germanium Hall plates, many modifications of these methods may be made, and I intend by the appended claims to cover all such modifications as fall within the true scope and spirit of my invention.

What I claim as new and desire to secure by Letters Patent of the United States is:

1. The method of making germanium Hall plates, which method comprises extracting a wafer of germanium no greater than 0.060 inch thick from an ingot of highly purified germanium, heating the wafer for an extended period of time at a temperature above 600 degrees centigrade but below the melting point of germanium, and rapidly cooling the heated wafer at a cooling rate of at least 200 degrees per second.

2. The method of treating germanium Hall plates no greater than 0.060 inch thick, which method comprises heating the plate for an extended period of time at a temperature above 600 degrees centigrade but below the melting point of germanium, and rapidly cooling the heated plate at a cooling rate of at least 200 degrees per second.

3. The method of making germanium Hall plates, which method comprises extracting a wafer of germanium no greater than 0.060 inch thick from an ingot of germanium purified to have an inherent bulk resistivity of at least 5 ohm centimeters, heating the wafer for more than one-half hour at a temperature in the neighborhood of 900 degrees centigrade, and quenching the heated wafer at a cooling rate of at least 200 degrees per second by immersion within a cooling medium.

4. The method of treating germanium Hall plates no greater than 0.060 inch thick of the type purified to have an inherent bulk resistivity of at least 5 ohm centimeters, which method comprises heating the plate for more than one-half hour at a temperature above 600 degrees centigrade but below the melting point of germanium, and quenching the heated plate at a cooling rate of at least 200 degrees per second by immersion within a cooling medum that is chemically inactive with respect to germanium.

5. The method of making germanium Hall plates, which method comprises extracting a wafer of germanium having a thickness no greater than .60 inch from an ingot of highly purified germanium, heating the wafer for an extended period of time at a temperature above 600 degrees centigrade but below the melting point of germanium, and rapidly cooling the heated wafer by immersion within a fluid cooling medium chemically inactive relative to germanium and maintained at substantially room temperature.

6. The method of treating highly purified germanium Hall plates having a thickness no greater than .060 inch which method comprises heating the plate for more than one-half hour at a temperature ranging from 600 degrees to 950 degrees centigrade, and rapidly cooling the heated wafer to room temperature at a cooling rate of at least 200 degrees per second.

7. The method of making germanium Hall plates, which method comprises extracting from an ingot of highly purified germanium a wafer of germanium having a thickness no greater than .060 inch heating the wafer for more than one-half hour at a temperature above 600 degrees centigrade but below the melting point of germanium, and rapidly cooling the heated wafer to room temperature by successive quenching stages to successively lower temperatures, each quenching stage providing a cooling rate of at least 200° per second.

8. The method of treating germanium Hall plates no greater than 0.060 inch thick, which method comprises heating the plate for more than one-half hour at a temperature above 600 degrees centigrade but below the melting point of germanium, and rapidly cooling the heated wafer in successive stages to successively lower temperatures, each cooling stage providing a cooling rate of at least 200° per second and following the preceding cooling stage after a time interval of less than ten seconds.

9. The method of treating highly purified germanium Hall plates having a thickness no greater than 0.060 inch, which method comprises heating the plates for more than one-half hour at a temperature above 600 degrees centigrade but below the melting point of germanium and rapidly cooling the heated plate by subjecting the heated plate to a rapid succession of quenching stages each stage providing a cooling rate of at least 200° per second to successively lower temperatures.

10. The method of making germanium Hall plates, which method comprises extracting a wafer of germanium no greater than 0.060 inch thick from an ingot of germanium purified to have an inherent bulk resistivity of at least 5 ohm centimeters, heating the wafer for more than one-half hour at a temperature above 600 degrees centigrade but below the melting point of germanium, cooling the heated wafer to a temperature intermediate room temperature and the initial heating temperature at a cooling rate of at least 200 degrees per second, and then cooling the wafer from the intermediate temperature to room temperature at a cooling rate of at least 200 degrees per second.

11. The method of treating germanium Hall plates having a thickness no greater than 0.060 inch and an inherent bulk resistivity of at least 5 ohm centimeters, which method comprises heating the plate for more than one-half hour at a temperature above 600 degrees centigrade but below the melting point of germanium, cooling the heated plate at a cooling rate of at least 200 degrees per second, and then reheating the cooled plate at a temperature in the neighborhood of 500 degrees centigrade to control the final resistivity thereof.

WILLIAM CRAWFORD DUNLAP, JR.

References Cited in the file of this patent

FOREIGN PATENTS

| Number | Country | Date |
|---|---|---|
| 632,980 | Great Britain -------- | Dec. 5, 1949 |

OTHER REFERENCES

"Further Developments in the Preparation and Heat Treatment of Germanium Alloys," NDRC Report 14–576, October 31, 1945, pages 4–6.

"Crystal Rectifiers" by Torrey et al. McGraw-Hill Book Co., 1948. Pages 314–316.